United States Patent
Watai et al.

[11] Patent Number: 5,788,356
[45] Date of Patent: Aug. 4, 1998

[54] SURFACE LIGHT SOURCE DEVICE OF SIDE LIGHT TYPE

[75] Inventors: Kayoko Watai; Kayoko Masaki, both of Saitama; Hiromi Sasako, Tokyo, all of Japan

[73] Assignees: Enplas Corp., Saitami; Yasuhiro Koike, Kanagawa, both of Japan

[21] Appl. No.: 622,161

[22] Filed: Mar. 27, 1996

[30] Foreign Application Priority Data

Mar. 30, 1995 [JP] Japan ................................. 7-095869
Nov. 14, 1995 [JP] Japan ................................. 7-330973

[51] Int. Cl.$^6$ ................................. F21V 8/00
[52] U.S. Cl. ................... 362/31; 362/26; 362/351
[58] Field of Search ........................ 362/31, 26, 351, 362/298, 299, 300, 301; 349/61, 62, 67

[56] References Cited

U.S. PATENT DOCUMENTS

| | | | |
|---|---|---|---|
| 4,903,172 | 2/1990 | Schoniger | 362/31 |
| 5,027,258 | 6/1991 | Schoniger | 362/31 |
| 5,055,978 | 10/1991 | Rogoff | 362/31 |
| 5,146,354 | 9/1992 | Plesinger | 362/31 |
| 5,211,464 | 5/1993 | Bohmer | 362/31 |
| 5,485,354 | 1/1996 | Ciupke et al. | 362/31 |

FOREIGN PATENT DOCUMENTS 4-4688  4/1992  Japan .

OTHER PUBLICATIONS

English language abstract & Japanese Laid–Open Patent Application No. 2–17, Jan. 05, 1990, Surface Light Source Element, Makoto OE.

*Primary Examiner*—Thomas M. Sember
*Attorney, Agent, or Firm*—Staas & Halsey

[57] ABSTRACT

In a surface light source device of side light type, occurrence of irregularities in luminance is prevented in the vicinity of an incidence surface 10 of a light guide plate 1. A light source element 2 is disposed on a lateral side of the light guide plate 1 and the light introduced into the light guide plate 1 through the incidence surface 10 is emitted through an emission surface 11. The light comes outside after undergoing the action of an additional element 3 (such as a priority traveling direction correcting action) and is applied to, for example, back lighting in a liquid crystal display. A reflection sheet such as a silver foil is disposed along a rear surface 12. The rear surface 12 is treated in various manners in order to reflect the light toward the emission surface 11. Another reflection sheet 20 is disposed as a reflector surrounding the light source element 2 from the back side. A case 4 partially projects inward along the incidence surface 10 to form light shielding walls 8, 9. The shielding walls 8, 9 are adapted to prevent light emitted from the light source element 2 from intruding through gaps G1 to G4 between the elements, or through an end surface of an end edge portion 3a of the additional element.

24 Claims, 15 Drawing Sheets

5,788,356

SURFACE LIGHT SOURCE DEVICE OF SIDE LIGHT TYPE

BACKGROUND

1. Field of Invention

This invention relates to a surface light source device of type having a primary light source disposed on the lateral side of a light guide plate and using one surface of a light guide plate as an emission surface (that is, "surface light source device of side light type"), and more specifically to a surface light source device of side light type capable of avoiding irregularities in emission caused in the vicinity of the primary light source.

In particular, the surface light source device of the present invention is effectively applied to back lighting for a liquid crystal display requiring display quality without irregularities.

2. Related Art

Initially, an illustration will be given on a typical structure in the vicinity of a primary light source in a surface light source device of side light type and on functions of parts associated with the structure. Unless otherwise indicated, the illustration including reference numerals and designations of elements are also applied to structures and operations described in association with FIG. 2 and later drawings. Therefore, descriptions of the common matters will be appropriately omitted to avoid repetition. Further, as a matter of convenience, thickness of elements (such as a reflection sheet, an additional element, and a case) will be appropriately exaggerated or reduced in the drawings.

FIG. 1 is a sectional view illustrating the structure in the vicinity of the primary light source in a conventional surface light source device of side light type. In the drawing, reference numeral 1 denotes a light guide plate made of a transparent plastic material or another material obtained by adding appropriate scattering power thereto (namely, a light-scattering light guide). On a lateral side of the light guide plate 1, a long tube-like light source element 2 is disposed as the primary light source along a side end surface (incidence surface) 10 of the light guide plate 1. Typically, a cold-cathode tube such as a fluorescent lamp is employed as the light source element 2.

One surface of the light guide plate 1 is defined as an emission surface 11 on which various elements 3 (hereinafter referred to as additional elements) are additionally disposed. There are several types of additional elements 3. Typical examples are as follows:

(1) Light diffusion sheet; Element to diffuse traveling directions of the light emitted from the emission surface 11. Generally, it has a function of reducing fine irregularities in luminance and an additional function of reducing luminance level due to random light scattering effect.

(2) Prism sheet; Sheet having a single surface or both surfaces serving as prism surfaces. It is mainly employed to direct the principal traveling direction (priority traveling direction) of the light emitted from the emission surface 11 to a desired direction, for example, a front direction.

(3) Prism sheet protection sheet; Sheet employed to protect the prism surface of the prism sheet from, for example, damage, or adhesion of dust, and typically including a transparent sheet with both flat surfaces.

(4) Interference fringe prevention sheet; Sheet employed to prevent an interference fringe from occurring in the vicinity of the emission surface 11 due to multiple reflection and from causing irregularities in luminance. It is made of, for example, a transparent sheet having an appropriately uneven surface.

The respective elements may be employed singly although a plurality of elements of the same type may be employed, or two or more types of elements may be employed simultaneously. Alternatively, another element simultaneously having the functions of the elements may be employed. In every cases, the outermost surface of the additional element 3 serves as a luminant surface 30 of the surface light source device.

On a rear surface 12 opposed to the emission surface 11, a reflection sheet 6 is disposed along the rear surface 12. For example, a silver foil, an aluminum foil, or a white sheet may be employed as the reflection sheet 6. Further, the rear surface 12 is treated in various manners for reflection of light toward the emission surface 11, but not shown in the drawing. Typical treatments include a print pattern of light diffusive ink and V-shaped notches to provide an edge light effect.

Reference numeral 4 denotes a case surrounding an end edge portion 3a of the additional element 3, the light source element 2 and the reflection sheet 6. The distance between a head edge portion 4a of the case and the emission surface 11 is designed to be substantially equal to the thickness of the end edge portion 3a. In some cases, an adhesive double-coated tape may be employed for rigid adhesion between the head edge portion 4a and the additional element 3, or between the additional element 3 and the emission surface 11.

Thus, an extremely narrow gap G1 between the head edge portion 4a and the additional element 3 and an extremely narrow gap G2 between the additional element 3 and the emission surface 11 provide air layers, or layers including the double-coated tape and adhesive. Similarly, extremely narrow gaps G3 and G4 on the side of the rear surface 12 form the air layers, or the layers including the double-coated tape and the adhesive. Further, another reflection sheet 20 (shown by a broken line; the sheet includes, for example, a flexible base material to which a silver foil is applied, and the same hereinafter) is often disposed as a reflector surrounding the light source element 2 from the rear surface side.

In some cases, both end edge portions of the reflection sheet 20 may be inserted among the gaps G1 to G4. Further, the light source element 2 may additionally be disposed on the unillustrated side of the light guide plate 1 (referred to as twin-light arrangement). In this case, it is to be noted that the peripheral structure is the same as described above.

According to the above structure, most of light emitted from the light source element 2 is directly or indirectly introduced into the light guide plate 1 through the incidence surface 10. The light introduced into the light guide plate 1 is guided toward an opposite edge portion which is not shown. In the process, the light is emitted little by little from the emission surface 11 under known principles (composite effects including multiple reflections at the front and rear surfaces of the light guide plate 1, edge light effect, light scattering in the light guide plate, and so forth).

The light emitted from the emission surface 11 is emitted to the outside after the light undergoes the actions of the additional element 3 (including diffusing, a priority traveling direction correcting, and so forth). Then the light is applied to, for example, back lighting for a liquid crystal display.

However, in the surface light source device having the conventional structure described above, there is a characteristic in that irregularities in luminance with high spatial frequency components for the horizontal direction in the drawing occur in an area 31 around the end edge portion of the ruminant surface 30 (hereinafter referred to as end edge portion of the luminant surface). The irregularities in luminance are observed as a fringe pattern including highlight and shadow, thereby causing a major problem when the surface light source device is employed as a back light source for a liquid crystal display. The fringe pattern including highlight and shadow or the phenomenon causing it is sometimes called "intrusive brightening".

FIG. 8 is a graph illustrating the problem. In the graph, the transverse axis defines a distance from the incidence surface 10 in millimeters, and the ordinate axis defines luminance in nits ($cd/m^2$), measured from a position just above the luminant surface. The depth of the light guide as viewed from the light source element 2 was sized to be about 145 mm.

In this case, the light source element 2 was a single cold-cathode tube employed as the primary light source for back lighting of a typical liquid crystal display having the same size (single-light arrangement). Further, silver foils were employed as the reflection sheets 6 and 20 while an interference fringe prevention sheet interposed between two prism sheets was employed as the additional element 3.

As is immediately read from the graph, a sharp peak A of luminance level is in a portion less than 10 mm from the incidence surface 10. On the outside the peak (on the side farther away from the incidence surface 10), the graph shows a luminance level unstable area including a trough B.

It is supposed that the irregularities in luminance occur due to the causes as follows:

(1) Emission, from the luminant surface 30, of light other than the light introduced into the light guide plate 1 through the incidence surface 10 (so-called leakage of light). Typical paths of the emission include (i) a path by which the light intrudes into the luminant surface 30 through the gaps G1 to G4, (ii) a path by which the light is incident though the end surface of the additional element 3 and intrudes onto the luminant surface 30 through its head end portion 3a, and (iii) a combination of the above paths.

(2) Presence of a path by which light intrudes into the light guide plate 1 at an angle largely inclined with respect to the incidence surface 10 and is directly emitted from the luminant surface 30 through the emission surface 11 of the light guide plate 1 and the additional element 3.

(3) Presence of a path by which light intrudes into the light guide plate 1 at an angle largely inclined with respect to the incidence surface 10 and is emitted from the luminant surface 30 after regular reflection at the rear surface of the light guide plate 1, the front and rear surfaces of the end edge portion 3a of the additional element 3, an inner side surface of the head edge portion 4a of the case 4, and so forth.

It is supposed that the interface transmittance of the emission surface 11 viewed from the inside of the light guide plate 1 varies rapidly across the critical angle condition and it particularly contributes to the formation of the paths (2) and (3).

As seen from the graph of FIG. 8, the irregularities in luminance occur in an area close to the incidence surface 10 even when the light passes through any of the paths. Therefore, it is possible to hide the portion having the irregularities in luminance by employing a case 4 with a longer head end edge portion 4a in FIG. 1. However, the method results in a reduced effective area of the luminant surface 30, thereby naturally decreasing an efficiency of light utilization in the surface light source device. Further, if the irregularities in luminance are hidden by using the light diffusion sheet as the additional element 3, the entire luminance level is inevitably reduced due to the light diffusion sheet.

In order to overcome the above problems, there has been proposed the following method (refer to Japanese Utility Model Laid-open No. 4-42688). According to the proposal, a structure shown in FIG. 2 is employed. That is, a light absorptive member 5 including, for example, a black tape is disposed on the inside of a head edge portion 4a of a case 4. By disposing the light absorptive member 5 in such a manner, it is possible to block light intruding through a gap G5 (equivalent to G1 in FIG. 1) formed along an end edge portion 3a of an additional element 3 and leaking out to the side of a ruminant surface 30. Thus, reduction of the irregularities in luminance is expected because the causes (1) to (3) are eliminated to some extent.

In particular, when light diffusion properties are given to the additional element 3 or an emission surface 11 of the light guide plate 1, the above method will serve effectively. An exaggerated gap G5 is illustrated in FIG. 2.

However, the light diffusion properties given to the additional element 3 or the emission surface 11 of the light guide plate 1 cause problems of reduction of the entire luminance level and random extension of the traveling direction of light. In particular, when a prism sheet is employed as the additional element 3 to correct a priority traveling direction, it is impossible to take full advantage of the function of the prism sheet.

FIG. 9 shows the result of measurement of a luminance distribution in the luminant surface 30 under the same condition as that providing the result shown in the graph of FIG. 8 except that the structure in FIG. 2 is employed instead of the structure in FIG. 1.

As is immediately read from the graph, a peak observed in close proximity to the incidence surface 10 has a height reduced to the average level in the entire luminant surface. However, instead of the peak, a wide trough area C of the luminance level with a significant depth is observed in an area slightly apart from the incidence surface 10. Further, small peaks E, E having high luminance levels (so-called "emission lines") are caused in portions farther away from the incidence surface 10 than the area C. As set forth above, even in the above proposal, it is supposed that the irregularities in luminance are not sufficiently overcome in the vicinity of the incidence surface 10.

Further, among the above irregularities in luminance, the emission line and dark band may more easily provide a significant affection when surface roughening is applied to the emission surface 11 of the light guide plate 1 made of transparent plastic material, when a convex lens array is formed on the emission surface 11 (refer to Japanese Patent Laid-open No. 2-17), or when a so-called light-scattering light guide is employed as the light guide plate 1.

The light-scattering light guide is formed by uniformly distributing microscopic structures having uneven refractive index inside a transparent optical material. For example, the light-scattering light guide is fabricated by uniformly distributing, in a matrix made of polymethyl methacrylate (PMMA having refractive index of 1.492), silicone resin fine particles having refractive index different from that of the matrix at a predetermined rate (for example, 0.08 wt %).

When the light-scattering light guide is employed as the light guide plate 1, light emitted from the emission surface 11 has a clear directivity so far as the size of each structure having uneven refractive index (for example, a diameter of the silicone resin fine particle) is not extremely small. That is, the emitted light has a priority traveling direction generally inclined at an angle ranging from 60 to 80 degrees with respect to the normal extending from the emission surface 11.

When a light guide plate 1 with the above directivity of emission is employed instead of the light diffusion sheet, the prism sheet is often employed as the additional element 3 to correct the priority traveling direction. This will provide an advantage of high luminance, in particular, improved brightness when viewed from a desired direction.

Otherwise, a transparent light guide plate 1 having a light emission surface 11 provided with roughness or convex lens eliminates the need for a diffusion sheet.

However, if the method is applied to eliminate the light diffusion sheet, it is impossible to expect an effect of blocking the irregularities in luminance, which would be expected by the light diffusion sheet. As a result, the irregularities in luminance caused on the emission surface 11 are not relieved and are observed even on the luminant surface 30.

OBJECT AND SUMMARY OF INVENTION

In view of the foregoing, it is an object of the present invention to provide a method of solving the above problems in a surface light source device of side light type, which have been difficult to solve in the prior art. That is, it is one object of the present invention to provide a surface light source device of side light type, in which it is possible to sufficiently block irregularities in luminance occurring in the vicinity of an incidence surface of a light guide plate with a little sacrifice of the efficiency of light utilization and the size of luminant surface.

The present invention provides a surface light source device of side light type including a light guide plate, and at least one primary light source disposed on a lateral side of the light guide plate, in which at least one additional element is disposed along an emission surface of the light guide plate and a reflector is disposed along a rear surface. In the surface light source device of side light type, at least one of the edge portions of the light guide plate on a side of the emission surface and a side of the rear surface has means for preventing light bypassing the incidence surface from into a region beyond a plane including the incidence surface.

The light intrusion preventing means may be various means as will be described later. They may be applied under employment of a light guide plate with roughened incidence surface.

(1) Light shielding wall extending along a plane including the incidence surface: the shielding wall extends from any of a case member surrounding a primary light source, a reflector member surrounding the primary light source and an additional element, further extending along a plane including the incidence surface.

(2) Case member surrounding a primary light source, which is disposed as to superimpose its end surface on at least one of edge portions of a light guide plate on the side of the emission surface and on the side of a rear surface.

(3) Sheet member having a light diffusing function, which is interposed between a primary light source and at least one of the edge portions on the side of the emission surface and on the side of the rear surface.

(4) Light shielding layer mounted on a light guide plate as to extend to the edge portion of the incidence surface from at least one of the edge portions of the light guide plate on the side of the emission surface and on the side of a rear surface.

(5) Presser member having elasticity interposed when a case member to surround a primary light source is attached to the light guide plate. The presser member and a reflection sheet interposed therewith are employed as the light intrusion preventing means.

(6) Means for pressing an additional element disposed along an emission surface to the emission surface may be employed as modification of the light intrusion preventing means. The pressing means may include a case member surrounding a primary light source and having elasticity such that its head edge portion may contribute to biasing of the additional element onto the emission surface.

In the surface light source device of side light type according to the present invention, at least one of the edge portions of the light guide plate on the side of the emission surface and on the side of the rear surface blocks the intrusion of light bypassing the incidence surface into the region on the side of the light guide plate with respect to the plane including the incidence surface.

It is possible to substantially completely prevent the light from intruding through the above paths by using the light shielding wall extending along the plane including the incidence surface as the light intrusion preventing means. The shielding wall may be, for example, a case member surrounding the primary light source a reflector member surrounding the primary light source and the additional element while the wall may be mounted as to extend along the plane including the incidence surface. As the shielding area of the shielding wall becomes larger, a shielding effect is more improved. However, in view of the efficiency of light utilization, shield of the incidence surface should be preferably minimized.

When an end surface of the case member is employed as the light intrusion preventing means, it is possible to prevent the light from intruding through the above paths with a more simple structure.

A light diffusion sheet disposed between the primary light source and the light guide plate on the side of the emission surface may be employed as the light intrusion preventing means, which diffuses the light from the primary light source, thereby relieving irregularities in luminance caused due to light intruding through the above paths.

A light shielding layer may be mounted as to extend around to the edge portion of the incidence surface from at least one of the edge portions of the light guide plate on the side of the emission surface and on the side of the rear surface, which serves as the light intrusion preventing means, thereby preventing the light from intruding through the above paths with a simple structure.

If an elastically deformed presser member or a combination of the presser member and a reflection sheet is employed as the light intrusion preventing means, the elastically deformed presser member covers the edge portion of the light guide plate on the side of the emission surface or on the side of the rear surface without any gap, thereby preventing the light from intruding through the above paths.

If a means for pressing the additional element disposed along the emission surface to the emission surface is employed as the light intrusion blocking means, it is difficult to completely prevent the light from intruding though the above paths. However, the light intrusion blocking effect is considerably improved by minimizing gaps, for example, between the edge portions of the incidence surface and the additional element, and between the additional element and the case.

Further, in addition to the above various light intrusion preventing means, surface roughening may be applied to the incidence surface of the light guide plate, thereby relieving lack of luminance in the emission surface, which might locally occur in the vicinity of the incidence surface. The surface roughening is particularly effective when the light guide plate includes a light-scattering light guide with a rear surface having no light diffusion layer.

In the surface light source device of side light type according to the present invention, even when no light diffusion properties are given to the additional element or to the emission surface of the light guide plate, it is possible to block irregularities in luminance in the vicinity of the incidence surface. Therefore, in general, no light diffusion properties is preferably given to the additional element or to the emission surface of the light guide plate.

However, even when the light diffusion properties are given to the additional element or the emission surface of the light guide plate by any reason such as depending on uses, the above functions of the light intrusion preventing means are never lost.

The present invention will more specifically be described with reference to the accompanying drawings.

PREFERRED EMBODIMENTS

Figure 3:
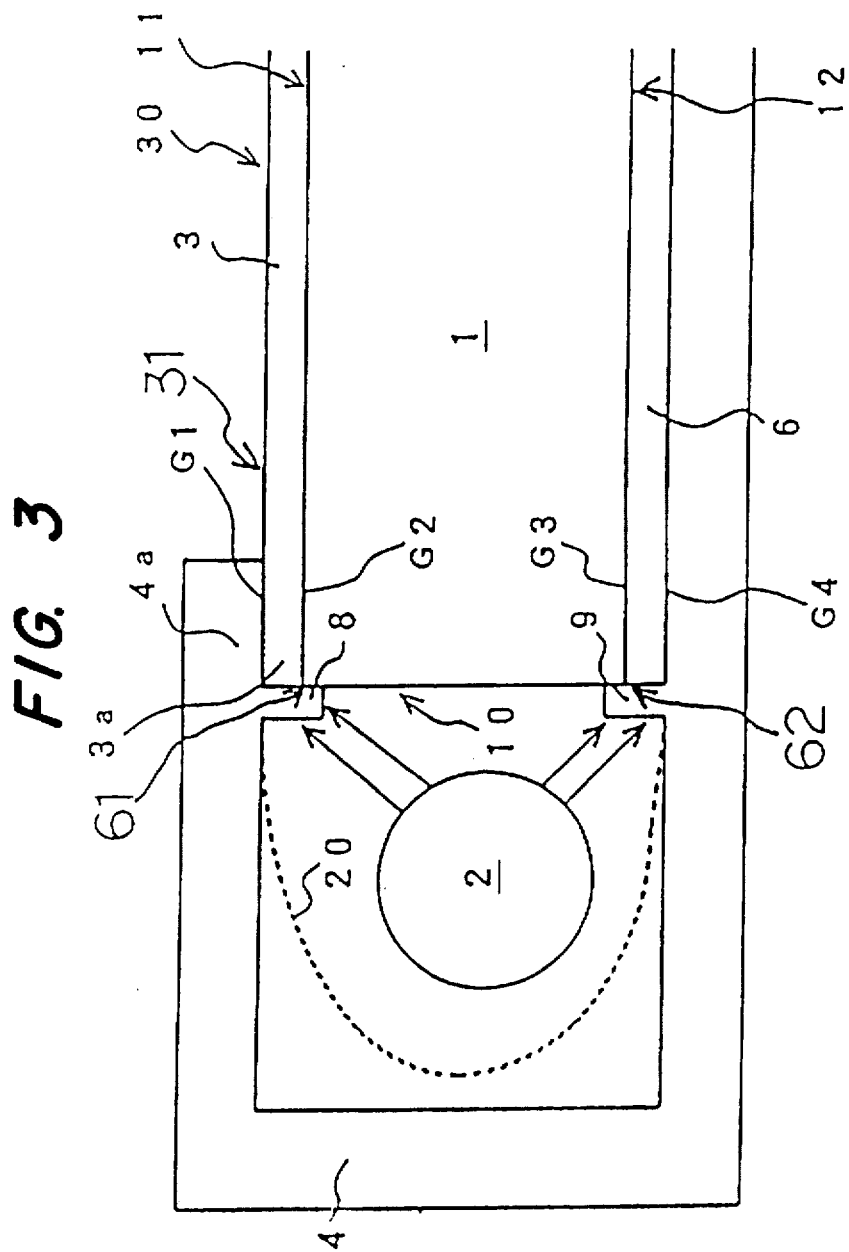
FIG. 3 is a sectional view showing a structure in the vicinity of a primary light source in a surface light source device of side light type according to the first embodiment of the present invention.

FIG. 3 is a sectional view showing a structure in the vicinity of a primary light source in a surface light source device of side light type according to the first embodiment of the present invention. A long tube-like light source element 2 is disposed on a lateral side of a light guide plate 1. Light introduced into the light guide plate 1 through an incidence surface 10 is guided toward the opposite edge portion which is not shown. In the process, the light is emitted little by little from an emission surface 11. The light emitted from the emission surface 11 is emitted to the outside after undergoing the action of an additional element 3 (diffusing, priority traveling direction correcting, and so forth). The light is employed for, for example, back lighting of a liquid crystal display.

On the side of a rear surface 12 opposed to the emission surface 11, a reflection sheet 6 is disposed along the rear surface 12. Regular-reflective material such as a silver foil or an aluminum foil is employed as the reflection sheet 6. It is also possible to use light-diffusive sheets such as a white sheet as the reflection sheet 6.

Further, the rear surface 12 is treated in various manners for reflection of light toward the emission surface 11, but not shown in the drawing. Typical treatments include a print pattern of light diffusive ink and a V-shaped notches to provide an edge light effect. Reference numeral 4 denotes a case surrounding an end edge portion 3a of the additional element 3, the light source element 2 and the reflection sheet 6. The distance between a head edge portion 4a of the case and the emission surface 11 is designed to be substantially equal to the thickness of the end edge portion 3a. In some cases, an adhesive double-coated tape may be employed for rigid adhesion between the head edge portion 4a and the additional element 3, or between the additional element 3 and the emission surface 11.

Thus, an extremely narrow gap G1 between the head edge portion 4a and the additional element 3 and another extremely narrow gap G2 between the additional element 3 and the emission surface 11 form air layers or layers including the double-coated tape and adhesive. Similarly, extremely narrow gaps G3 and G4 on the side of the rear surface 12 form the air layers or the layers including the double-coated tape and the adhesive. Another reflection sheet 20 (shown by a broken line) is disposed as a reflector surrounding the light source element 2 from the rear surface side.

Both end edge portions of the reflection sheet 20 are stuck to an inner wall of the case 4. Further, the light source element 2 may additionally be disposed on the unillustrated side of the light guide plate 1 (so-called twin-light arrangement). In this case, it is to be noted that the peripheral structure is identical with the structure described above.

Figure 1:
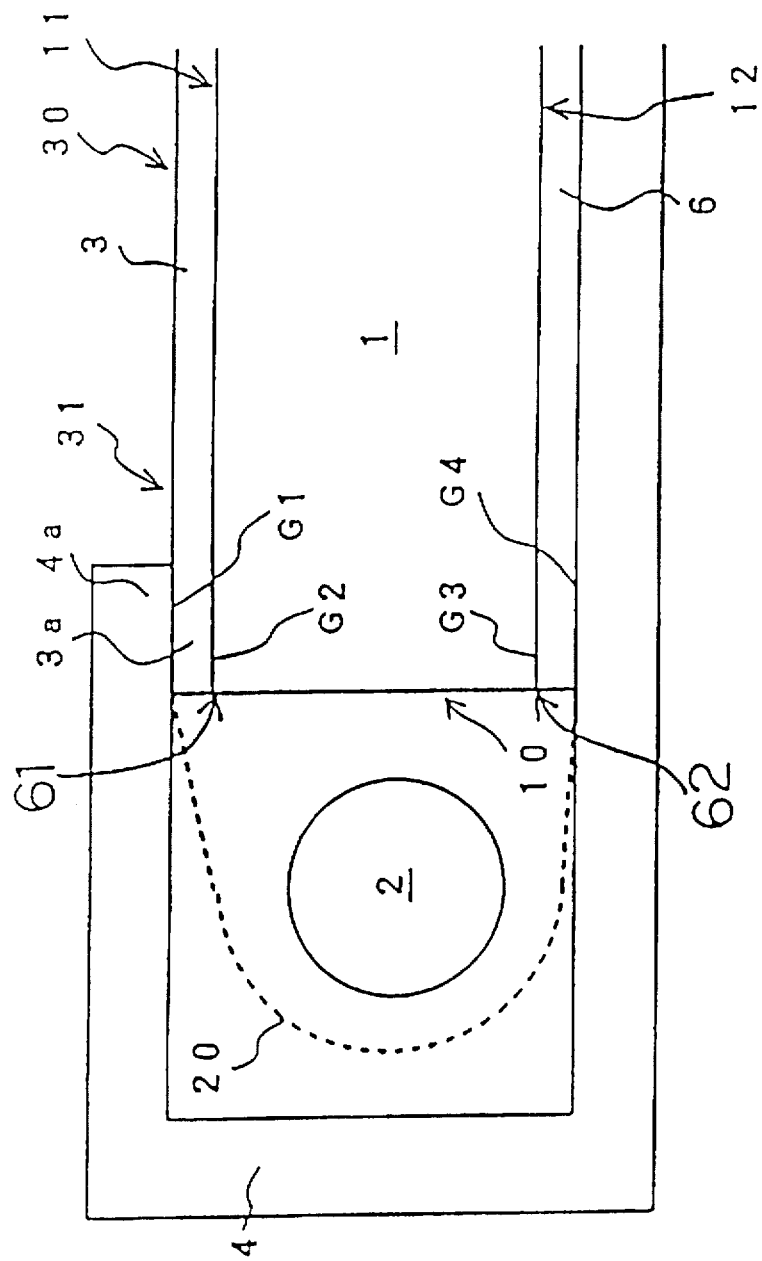
FIG. 1 is a sectional view illustrating a structure in the vicinity of a primary light source in a conventional surface light source device of side light type.

The above structure and its function are substantially identical with those shown in FIG. 1. According to a technical idea of the present invention, it is characterized in that the case 4 partially projects inward along the incidence surface 10 to form light shielding walls 8 and 9. The shielding walls 8 and 9 are adapted to prevent the light emitted from the light source element 2 from intruding through the gaps G1 to G4 between the respective elements, or the end surface of the end edge portion 3a of the additional element 3. Therefore, it is possible to substantially completely eliminate the above causes (1) and (2).

Further, edge portions 61 and 62 of the incidence surface 10 are coated with the shielding walls 8 and 9, thereby breaking the intrusion path of light from the edge portions 61 and 62 into the light guide plate 1. Consequently, it is also possible to provide an action for blocking light intrusion through the above path (3). As a result, a phenomenon causing "emission line" is relieved in the vicinity of the incidence surface 10.

Figure 4:
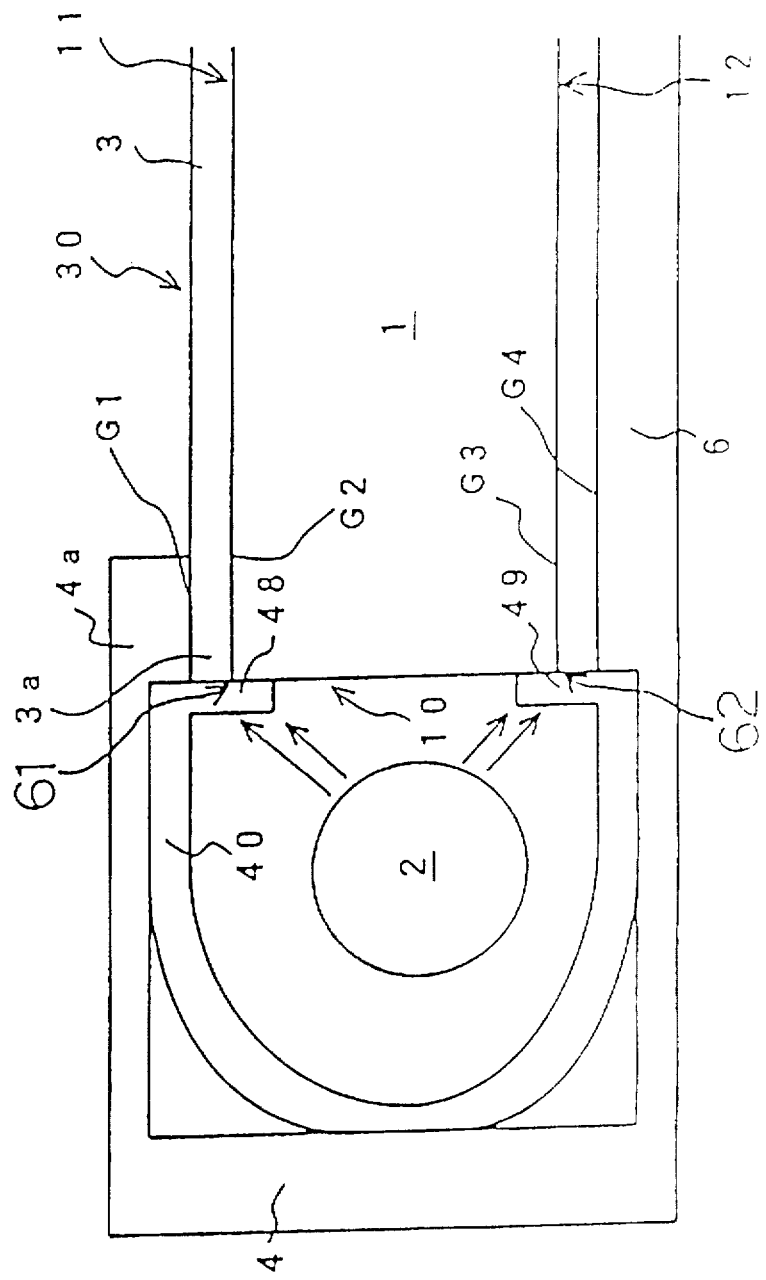
FIG. 4 is a sectional view showing a structure in the vicinity of a primary light source in a surface light source device of side light type according to the second embodiment of the present invention.

FIG. 4 is a sectional view showing a structure in the vicinity of a primary light source in a surface light source device of side light type according to the second embodiment of the present invention. The embodiment is equivalent to a modification of the first embodiment, in which the structure and function in the embodiment are basically common to those in the first embodiment. The embodiment is characterized in that a rigid member 40 is employed as a reflector surrounding a light source element 2 from the rear surface side, and both edge portions of the rigid member project inward along an incidence surface 10 to form light shielding walls 48 and 49. Alternatively, the member 40 may be employed as a case while the outer case 4 may be eliminated partially or completely.

The shielding walls 48 and 49 are adapted to prevent the light emitted from the light source element 2 from intruding through gaps G1 to G4 between elements, or an end surface of an end edge portion 3a of an additional element 3. Therefore, similarly to the first embodiment, it is possible to substantially completely eliminate the above causes (1) and (2).

Further, edge portions 61 and 62 of the incidence surface 10 are coated with the shielding walls 48 and 49, thereby breaking the intrusion path of light from the edge portions 61 and 62 into the light guide plate 1. Consequently, it is also possible to provide an action for blocking light intrusion through the above path (3). As a result, a phenomenon causing "emission line" is relieved in the vicinity of the incidence surface 10.

Figure 5:
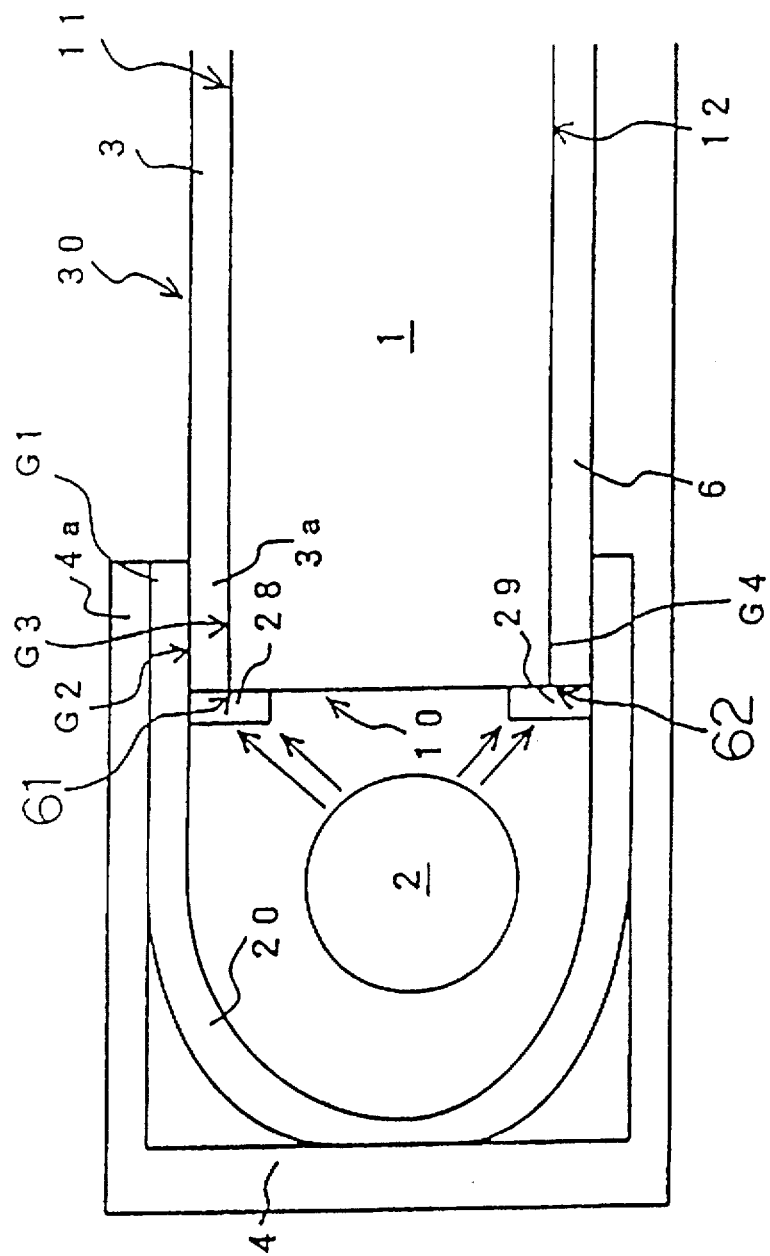
FIG. 5 is a sectional view showing a structure in the vicinity of a primary light source in a surface light source device of side light type according to the third embodiment of the present invention.

Next, FIG. 5 is a sectional view showing the structure in the vicinity of a primary light source in a surface light source device of side light type according to the third embodiment of the present invention. The embodiment is equivalent to a modification of the above second embodiment, in which the structure and function in the embodiment are basically common to those in the above second embodiment.

The embodiment is characterized in that light shielding walls 28 and 29 extending along an incidence surface 10 are secured to a head edge portion of a reflection sheet 20 surrounding a light source element 2 from the rear surface side. Adhesive may be employed as securing means. In this case, the reflection sheet 20 may be designed to have higher rigidity in order to avoid deviation of the light shielding walls 28 and 29 from their original positions. Further, the shielding walls 28 and 29 may complimentarily be secured to an end surface of an element (such as an additional element 3) other than the reflection sheet 20.

In the embodiment, the light shielding walls 28 and 29 are adapted to prevent the light emitted from the light source element 2 from intruding through gaps G2 to G4 between the elements, or an end surface of an end edge portion 3a of the additional element 3. A path passing through the gap G1 is blocked by the reflection sheet 20. Consequently, similarly to the first and second embodiments, it is possible to substantially completely eliminate the causes (1) and (2).

Further, edge portions 61 and 62 of the incidence surface 10 are coated with the shielding walls 29 and 29, thereby breaking the intrusion path of light from the edge portions 61 and 62 into the light guide plate 1. Consequently, it is also possible to provide an action for blocking light intrusion through the above path (3). As a result, a phenomenon causing "emission line" is relieved in the vicinity of the incidence surface 10.

Figure 6:
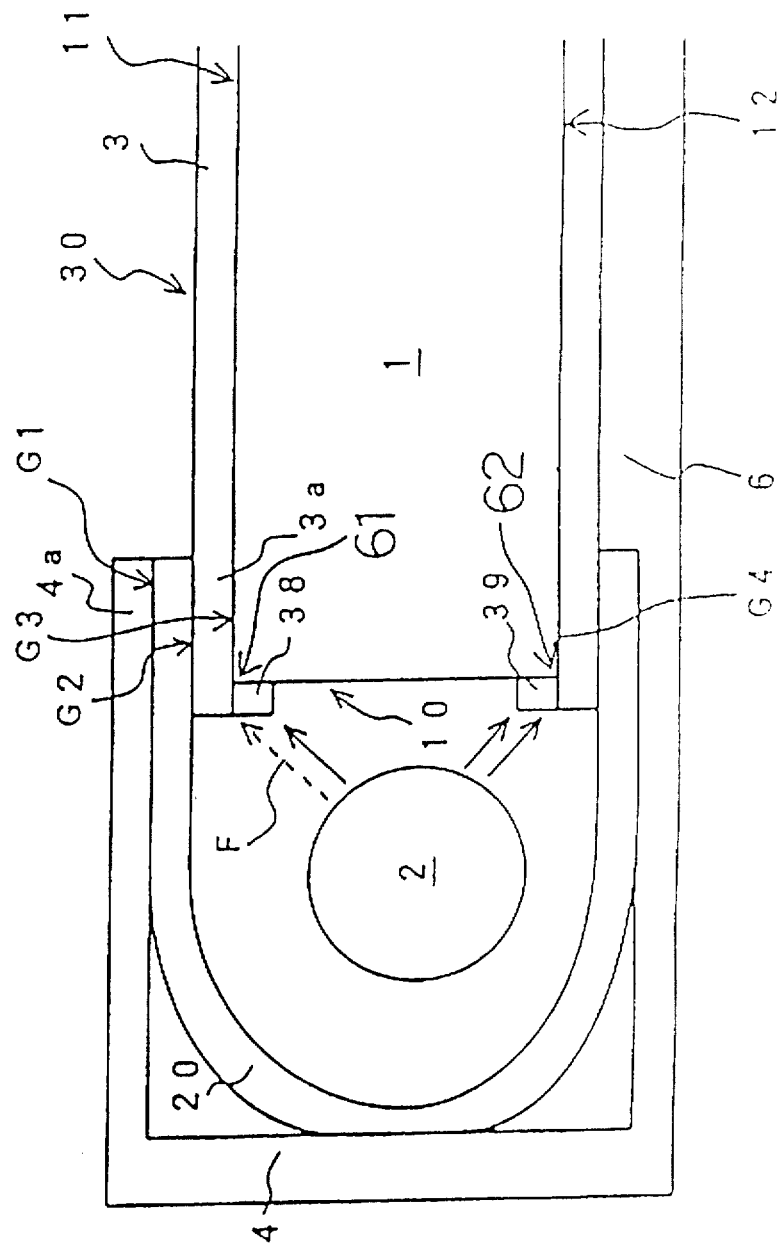
FIG. 6 is a sectional view showing a structure in the vicinity of a primary light source in a surface light source device of side light type according to the fourth embodiment of the present invention.

FIG. 6 is a sectional view showing the structure in the vicinity of a primary light source in a surface light source device of side light type according to the fourth embodiment of the present invention. The embodiment is equivalent to a modification of the above third embodiment, in which the structure and function in the embodiment are basically common to those in the third embodiment.

The embodiment is characterized in that light shielding walls 38 and 39 are secured to an inner side surface of a head edge portion 3a of an additional element 3. Adhesive may be employed as securing means. In the embodiment, the light shielding walls 38 and 39 are adapted to prevent the light emitted from a light source element 2 from intruding through gaps G3, G4. A path passing through the gap G1 is blocked by a reflection sheet 20. An intrusion path is left for light (shown by reference numeral F) intruding through a gap G2, or an end surface of the head edge portion 3a of the additional element. However, as a whole, it is possible to decrease the quantity of light which intrudes to the side of the light guide plate 1 with respect to the plane including the incidence surface 10 by bypassing the incidence surface 10. Therefore, the above causes (1) and (2) are eliminated.

Further, edge portions 61 and 62 of the incidence surface 10 are coated with the shielding walls 38 and 39, thereby breaking the intrusion path of light from the edge portions 61 and 62 into the light guide plate 1. Consequently, it is also possible to provide an action for blocking light intrusion through the above path (3). As a result, a phenomenon causing "emission line" is relieved in the vicinity of the incidence surface 10.

Figure 7:
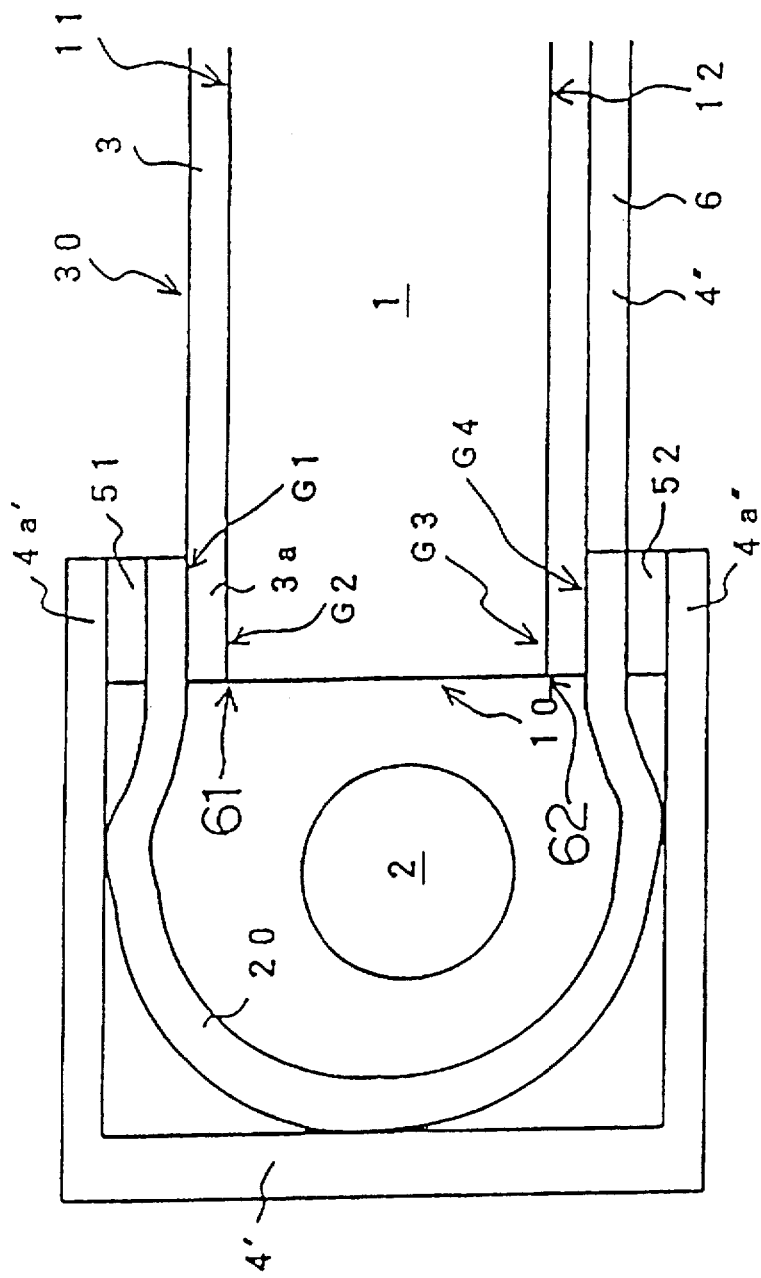
FIG. 7 is a sectional view showing a structure in the vicinity of a primary light source in a surface light source device of side light type according to the fifth embodiment of the present invention.

FIG. 7 is a sectional view showing the structure in the vicinity of a primary light source in a surface light source device of side light type according to the fifth embodiment of the present invention. In the embodiment, unlike the first to fourth embodiments, presser means is employed to block intrusion of light to the side of a light guide plate 1 with respect to a plane including an incidence surface 10. The structure and function other than the above description are basically common to those in the above embodiments.

The embodiment is characterized in that an elastic member is employed as a case 4' surrounding a light source element 2 while spacers 51, 52 including elastic members are respectively disposed inside a head edge portion 4'a on the side of an emission surface 11, and inside a head edge portion 4"a on the side of a rear surface 12. The spacers 51, 52 including the elastic members are designed to be set in a compressed state by inward pressing actions of the head edge portions 4' and 4" at the completion of assembly.

In the embodiment, though gaps G1 to G4 are formed along both surfaces of a head edge portion 3a of an additional element 3 and both surfaces of a reflection sheet 6, the gaps are minimized, thereby substantially completely blocking the intruding light through the gaps. An intrusion path is left for light intruding through an end surface of the head edge portion 3a of the additional element. However, as a whole, it is possible to decrease the quantity of light intruding to the side of the light guide plate 1 with respect to the plane including the incidence surface 10 by bypassing the incidence surface 10. Therefore, the above causes (1) and (2) are considerably eliminated.

Figure 8:
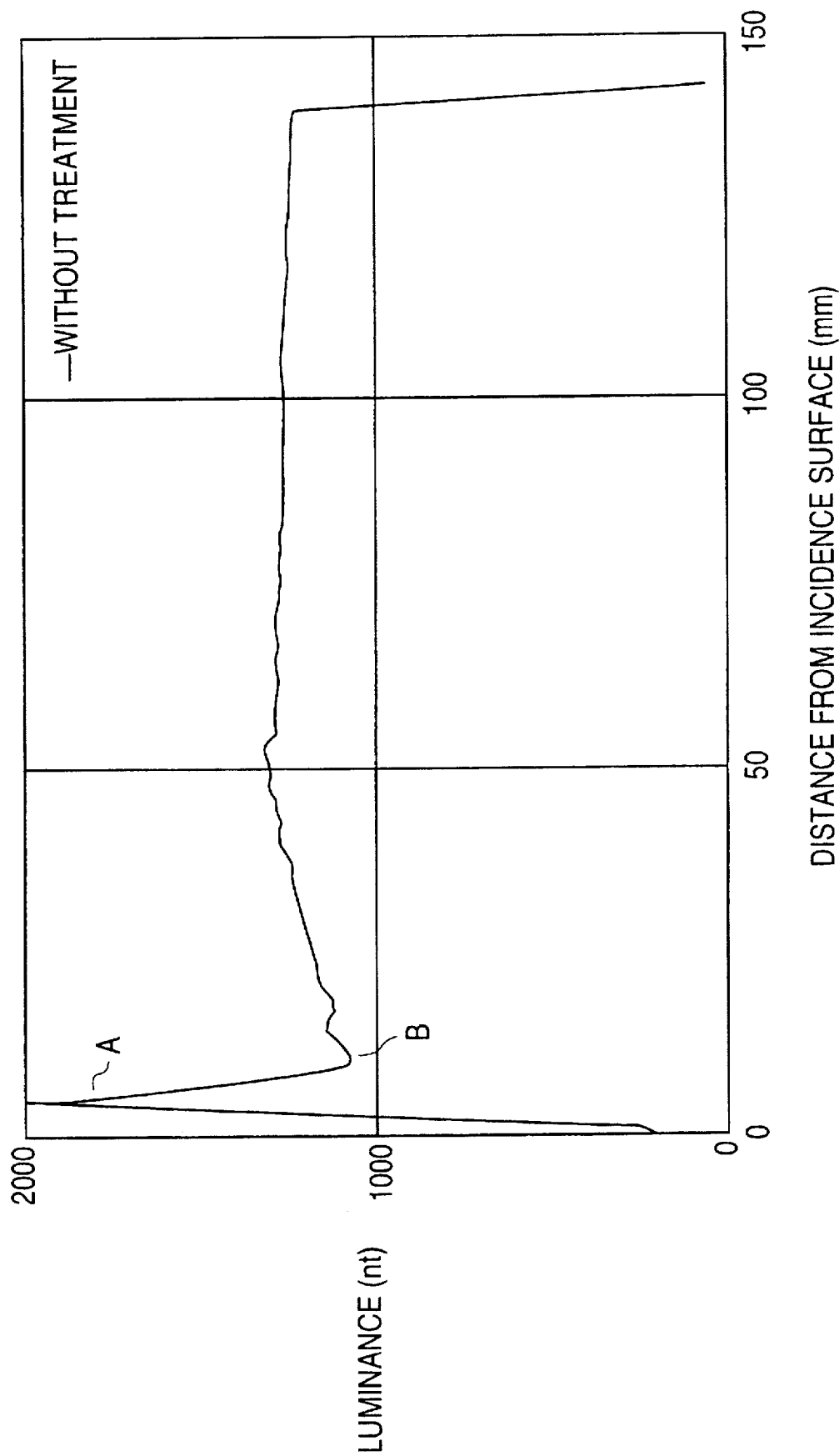
FIG. 8 is a graph showing the result of measurement of the luminance distribution on the luminant surface of a surface light source device of side light type having the conventional structure shown in FIG. 1.
Figure 9:
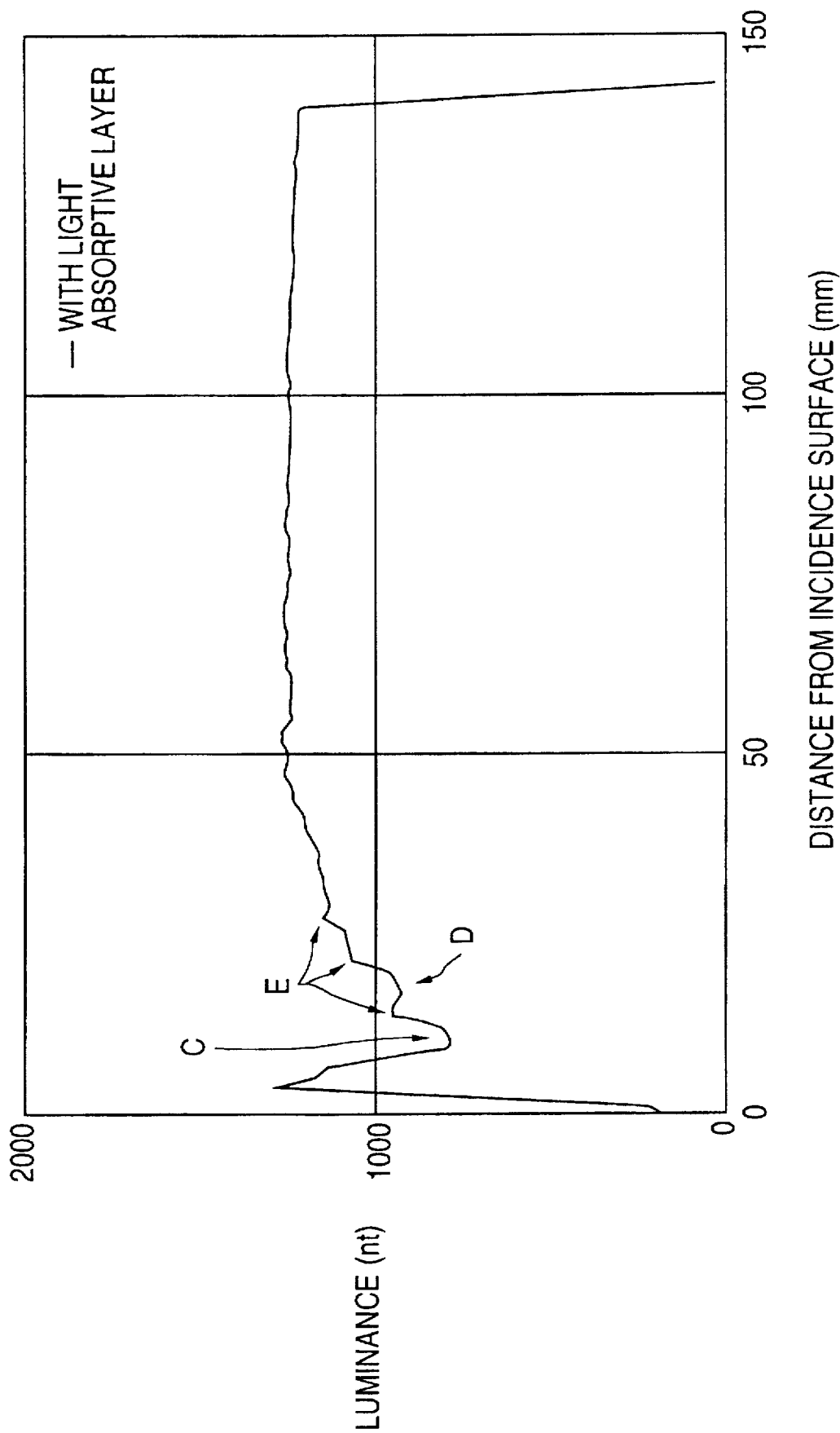
FIG. 9 is a graph showing the result of measurement of the luminance distribution on the luminant surface of a surface light source device of side light type having the conventional structure shown in FIG. 2.
Figure 10:
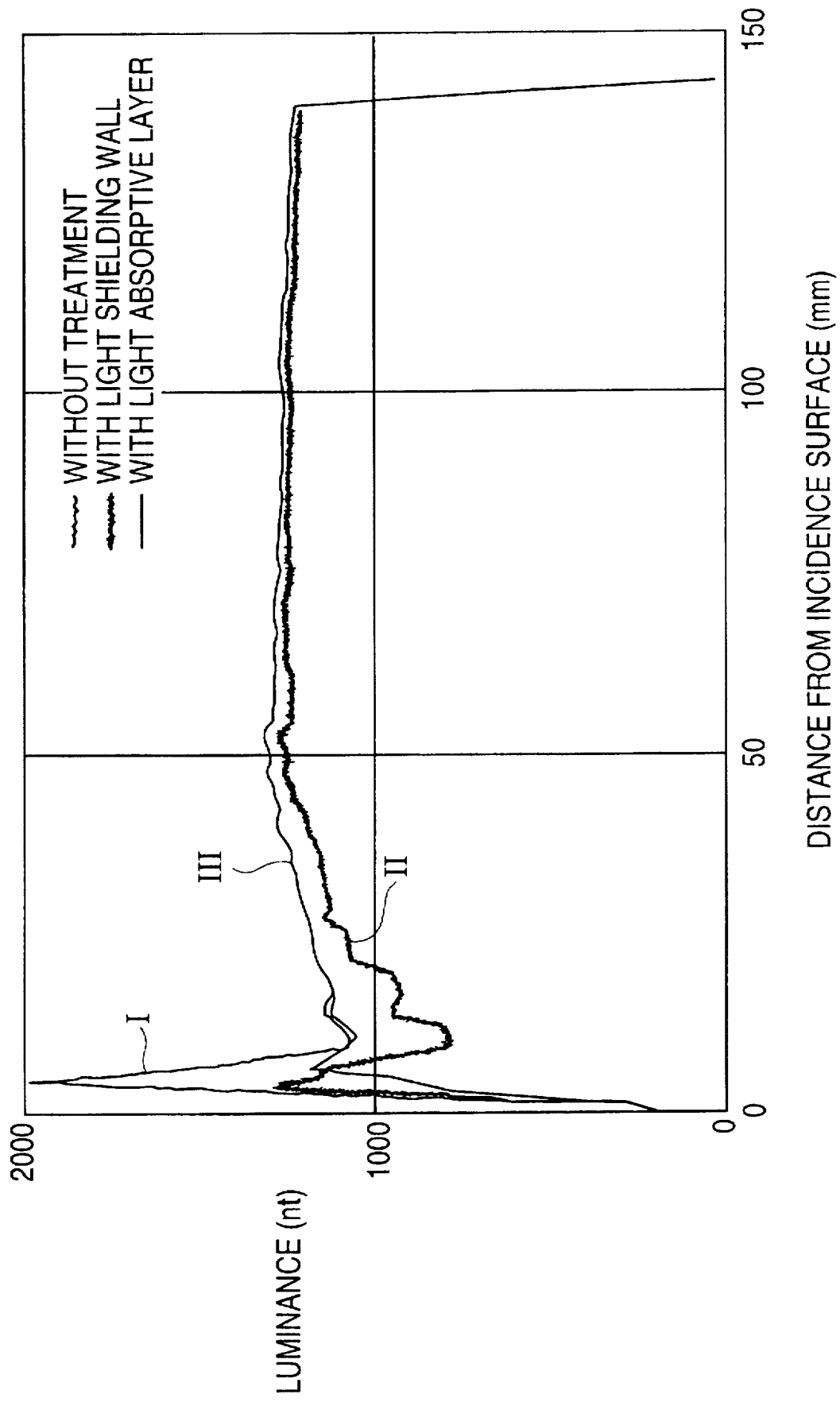
FIG. 10 is a graph showing the result of measurement of the luminance distribution on the luminant surface in a surface light source device of side light type according to the third embodiment of the present invention with the result superimposed on the graphs of FIGS. 8 and 9.

FIG. 10 is a graph to demonstrate an effect of blocking irregularities in luminance according to the present invention. The graph shows the result of comparison between the structure in the third embodiment as one example of the present invention and a structure in the prior art in view of appearance of irregularities in luminance. In the graph, luminance change curves (the result of measurement obtained in the structure in the prior art) are transcribed from the graphs of FIGS. 8 and 9 and designated by reference numerals I and II. Further, another luminance change curve in the third embodiment (having the structure of FIG. 5) is superimposed on the above curves and designated by reference numeral III.

Figure 2:
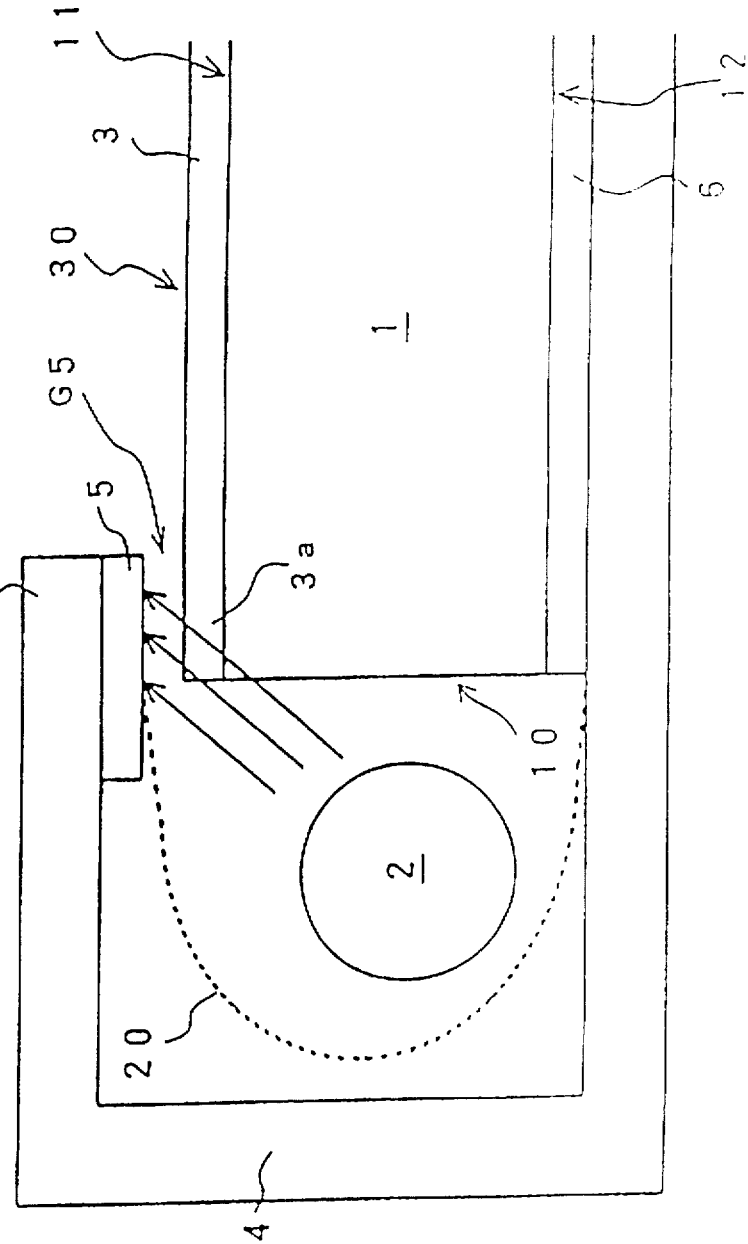
FIG. 2 is a diagram illustrating an improvement proposed in the prior art for the structure in the vicinity of the primary light source in a surface light source device of side light type.

The curve III shows the result of measurement of the luminance distribution on the luminant surface 30 under the same condition as that under which the results shown by the curves I and II are obtained except that the structure of FIG. 5 is employed instead of the structures of FIGS. 1 and 2. As is obvious from the comparison of the curves I, II and III, the curve III includes no rapid variation in luminance level in the vicinity of the incidence surface 10, which is otherwise observed in the curves I and II. Further, the luminance level in the vicinity of the incidence surface 10 is roughly equal to the mean level for the entire luminant surface 30. The above result sufficiently proves the effect of light intrusion preventing means employed in the present invention, including the shielding wall and the presser means in other embodiments.

Figure 11:
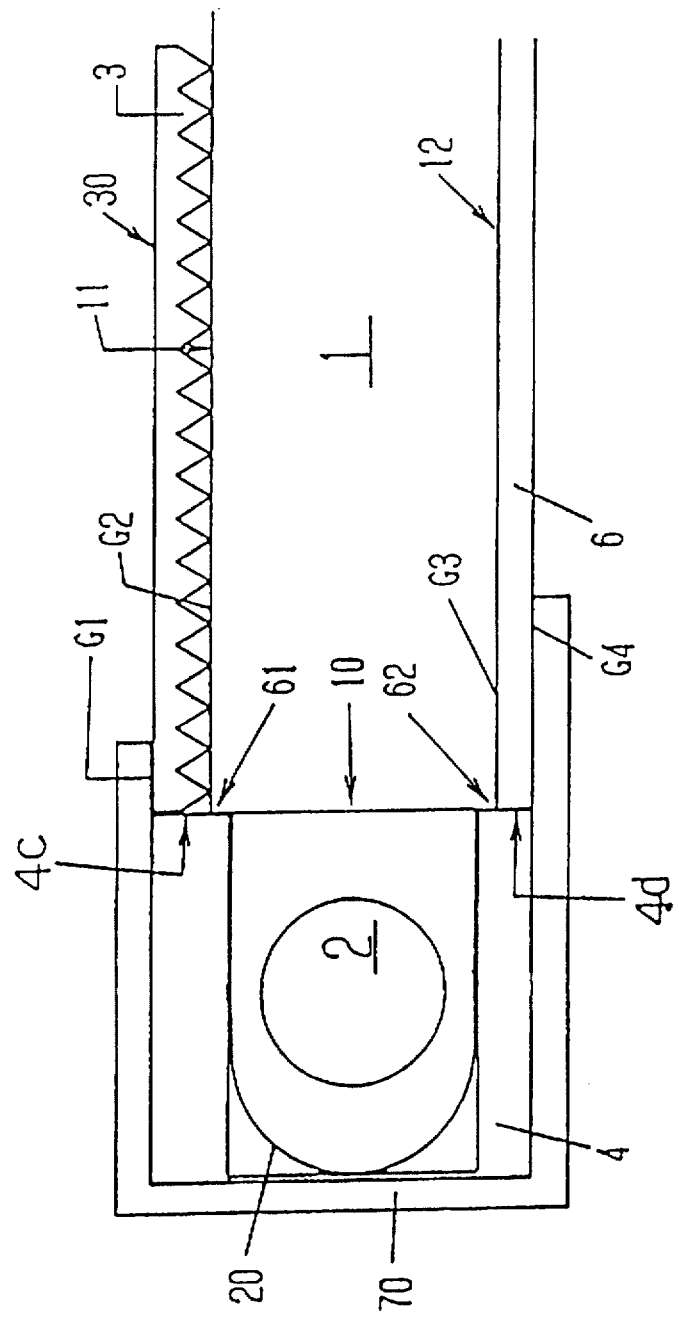
FIG. 11 is a sectional view showing a structure in the vicinity of a primary light source in a surface light source device of side light type according to a sixth embodiment of the present invention.

FIG. 11 is a sectional view showing the structure in the vicinity of a primary light source in a surface light source device of side light type according to the sixth embodiment of the present invention. The embodiment is equivalent to a modification of the above first embodiment, in which the structure and function in the embodiment are basically common to those in the first embodiment.

The embodiment is characterized in that end surfaces 4c, 4d of a case 4 surrounding a light source element 2 from the rear surface side extend parallel to an incidence surface 10, and the incidence surface 10 of a light guide plate 1 is disposed in contact with the end surfaces 4c, 4d of the case 4 so as to provide a relationship in which the end surfaces 4c, 4d are superimposed on an edge portion 61 of the light guide plate 1 on the side of an emission surface 11 and another edge portion 62 thereof on the side of a rear surface 12, and a part of the incidence surface 10. Thereby, the end surfaces 4c, 4d of the case 4 serve as light intrusion preventing means and are adapted to prevent light emitted from the light source element 2 from intruding through gaps G1 to G4 between elements, the edge portions 61 and 62 of the light guide plate 1 and an end surface of an end edge portion 3a of an additional element 3. Therefore, it is possible to substantially completely remove the above causes (1) and (2).

Further, the edge portions 61 and 62 of the incidence surface 10 are coated with the end surfaces 4c, 4d, thereby preventing light from intruding through the edge portions 61 and 62 into the light guide plate 1. Consequently, it is to be noted that a blocking action is also effected in the above path (3). Further, it is naturally possible to relieve occurrence of so-called "emission line" due to light intruding into the light guide plate 1 through the edge portion 61 or the edge portion 62 of the light guide plate 1.

Reference numeral 70 denotes a housing to accommodate an assembly including the case 4 and the light guide plate 1. The housing 70 accommodates the case 4, the light guide plate 1, a reflection sheet 6 and the additional element 3, thereby positioning the case 4 and the light guide plate 1 in the above relationship.

Figure 12:
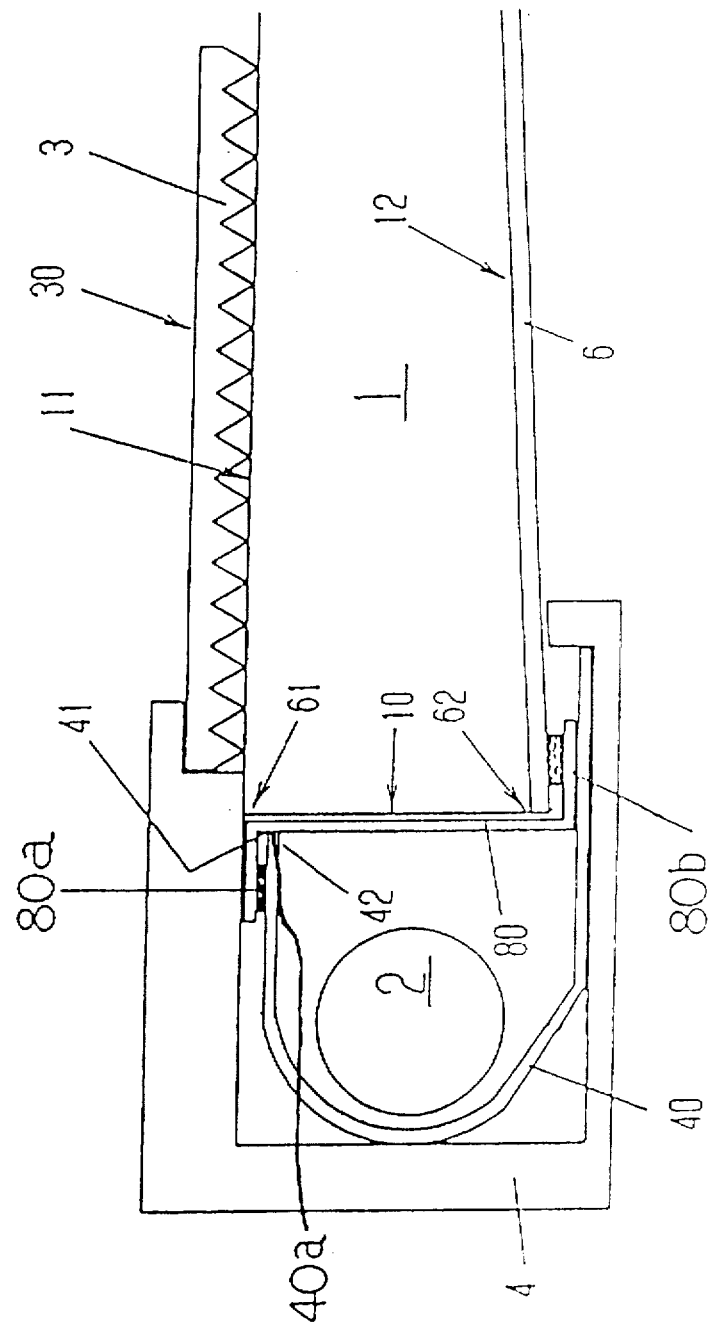
FIG. 12 is a sectional view showing a structure in the vicinity of a primary light source in a surface light source device of side light type according to a seventh embodiment of the present invention.

FIG. 12 is a sectional view showing a structure in the vicinity of a primary light source in a surface light source device of side light type according to the seventh embodiment of the present invention. In the embodiment, a wedge-shaped light-scattering light guide having a light scattering function in itself is employed as a light guide plate 1. Further, intrusion of light to the side of the light guide plate 1 with respect to a plane including an incidence surface 10 is prevented by a sheet member disposed on the front surface of the incidence surface 10 and an end surface of a reflector 40 made of a rigid member. The structure and function other than the above discussion are basically identical with those in the embodiments.

The embodiment is characterized in that the reflector 40 surrounding a light source element 2 includes a rigid body having a predetermined thickness and the reflector 40 is disposed such that the end surface 40a of the reflector 40 extends parallel to the incidence surface 10 of the light guide plate 1 and the upper surface 41 thereof may be positioned lower than the emission surface 11 of the light guide plate 1 in FIG. 12 while a sheet member 80 is interposed between the incidence surface 10 and the end surface of the reflector 40.

In the sheet member 80, the upper end portion 80a is secured, while being folded roughly at right angles, to the upper surface 41 of the reflector 40 by adhesive, an adhesive double-coated tape, or the like. The lower end portion 80b thereof is secured to a reflection sheet 6 disposed on a rear surface of the light guide plate 1 through the same means as that employed for the upper end portion 80a. The sheet member 80 is disposed in a state in which an intermediate portion thereof may be parallel to and in contact with the incidence surface 10 of the light guide plate 1.

In the embodiment, a relationship between the end surface 40a of the reflector 40 and the incidence surface 10 will provide a considerable effect as long as at least the lower surface 42 of the reflector 40 is positioned lower than the emission surface 11 of the light guide plate 1 (i.e., the lower surface 42 of the reflector 40 is positioned lower than an edge portion 61 of the light guide plate 1). However, the reflector 40 and the light guide plate 1 are preferably disposed in the relationship as shown in FIG. 12, in which the end portion 40a of the reflector 40 faces to the incidence surface 10 of the light guide plate 1 positively.

In the embodiment, since the upper surface 41 of the reflector 40 is positioned lower than the emission surface 11 of the light guide plate 1, the end surface 40a of the reflector 40 is opposed to the incidence surface at a position lower than the edge portion 61 of the light guide plate 1 on the side of the emission surface 11. It is thereby possible to prevent the light emitted from the light source element 2 from intruding into an upper portion of the incidence surface 10 including the edge portion 61 of the light guide plate 1.

Thus, it is possible to substantially completely prevent light from intruding through gaps G1 and G2.

A gap G3 is defined between the rear surface 12 of the light guide plate 1 and the reflection sheet 6 so that an intrusion path is left for light intruding through the gap G3. However, as a whole, it is possible to considerably decrease the quantity of light intruding to the side of the light guide plate 1 with respect to the plane including the incidence surface 10 by bypassing the incidence surface 10. Therefore, considerable parts of the above causes (1) and (2) are eliminated. Further, the edge portion 61 of the incidence surface 10 is coated with the end surfaces 40a, thereby preventing light from intruding through the edge portion 61 into the light guide plate 1. Consequently, it is to be noted that a blocking action is also provided in the above path (3). It is naturally possible to relieve occurrence of so-called "emission line" due to light intruding into the light guide plate 1 through the edge portion 61 or the edge portion 62 of the light guide plate 1.

In the embodiment, the sheet member 80 is employed to smoothly and accurately position the light guide plate 1 and the reflector 40. As a preferred sheet member, it is possible to use a transparent sheet having high light transmission properties or a diffusion sheet having slight light diffusion properties. When the diffusion sheet is employed as the sheet member 80, the light emitted from the light source element 2 is scattered by the sheet member 80 while the efficiency of light utilization slightly decreases. As a result, the intensity of the light intruding through the gap G3 is reduced, thereby reducing irregularities in luminance due to the light intruding therethrough. When the diffusion sheet is employed as the sheet member 80, in addition to the above arrangement, the diffusion sheet may be disposed integrally with the light guide plate 1 by sticking an intermediate portion thereof to the incidence surface 10.

If an accurate positioning of the incidence surface 10 of the light guide plate 1 and the end surface 40a of the reflector 40 is realized, the sheet member 80 is not always necessary and may be unemployed.

Since the light-scattering light guide is employed as the light guide plate 1 in the embodiment, in addition to the above light intrusion preventing means, surface roughening may be applied to the incidence surface of the light guide plate, thereby reducing lack of luminance in the emission surface (occurrence of so-called "dark band"), which would otherwise locally be caused in the vicinity of the incidence surface.

Figure 13:
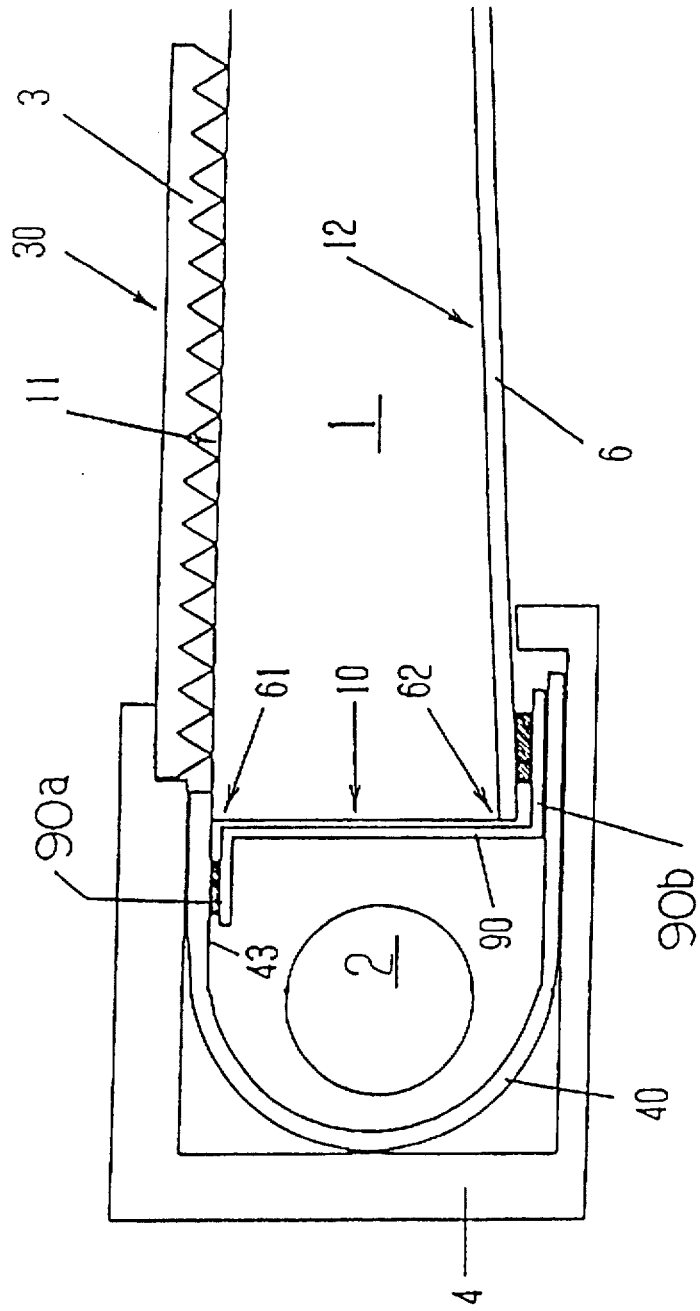
FIG. 13 is a sectional view showing a structure in the vicinity of a primary light source in a surface light source device of side light type according to an eighth embodiment of the present invention.

FIG. 13 is a sectional view showing the structure in the vicinity of a primary light source in a surface light source device of side light type according to the eighth embodiment of the present invention. According to the embodiment, a light-scattering light guide identical with that in the seventh embodiment is employed as a light guide plate 1 while a light diffusion sheet 90 is disposed between an incidence surface 10 and a light source element 2 as to extend parallel to the incidence surface 10 of the light guide plate 1 and vertically beyond upper and lower edge portions 61, 62 of the incidence surface 10. Further, the light diffusion sheet 90 itself is adapted to prevent light from intruding to the side of the light guide plate 1 with respect to a plane including the incidence surface 10. The structure and function other than the above discussion are basically identical with those in the embodiments.

The embodiment is characterized in that the diffusion sheet 90 is disposed on the incidence surface 10 of the light guide plate 1 to vertically extend beyond the upper and lower edge portions 61, 62 of the light guide plate 1. A reflector 40 includes a rigid body having a certain thickness, and folded roughly at right angles at a position lower than the emission surface 11 of the light guide plate 1 in FIG. 13. An upper end portion 90a of the light diffusion sheet 90 is secured to an inner side surface 43 of the reflector 40 through adhesive, an adhesive double-coated tape, or the like. Further, a lower end portion 90a thereof is secured to a reflection sheet 6 disposed on a rear surface 12 of the light guide plate 1 through the same means as that employed for the upper end portion 90a. The light diffusion sheet 90 is disposed to be parallel to and in contact with the incidence surface 10 of the light guide plate 1, and as to vertically extend beyond the upper and lower edge portions 61, 62 of the incidence surface 10.

In the embodiment, light from the primary light source is diffused by the diffusion sheet disposed between the primary light source and the emission surface of the light guide plate, thereby relieving irregularities in luminance due to light intruding through the above paths. It is naturally possible to relieve occurrence of so-called "emission line" due to light intruding into the light guide plate 1 through the edge portion 61 or the edge portion 62 of the light guide plate 1. The diffusion sheet 90 may be disposed integrally with the light guide plate 1 by sticking an intermediate portion thereof to the incidence surface 10.

Figure 14:
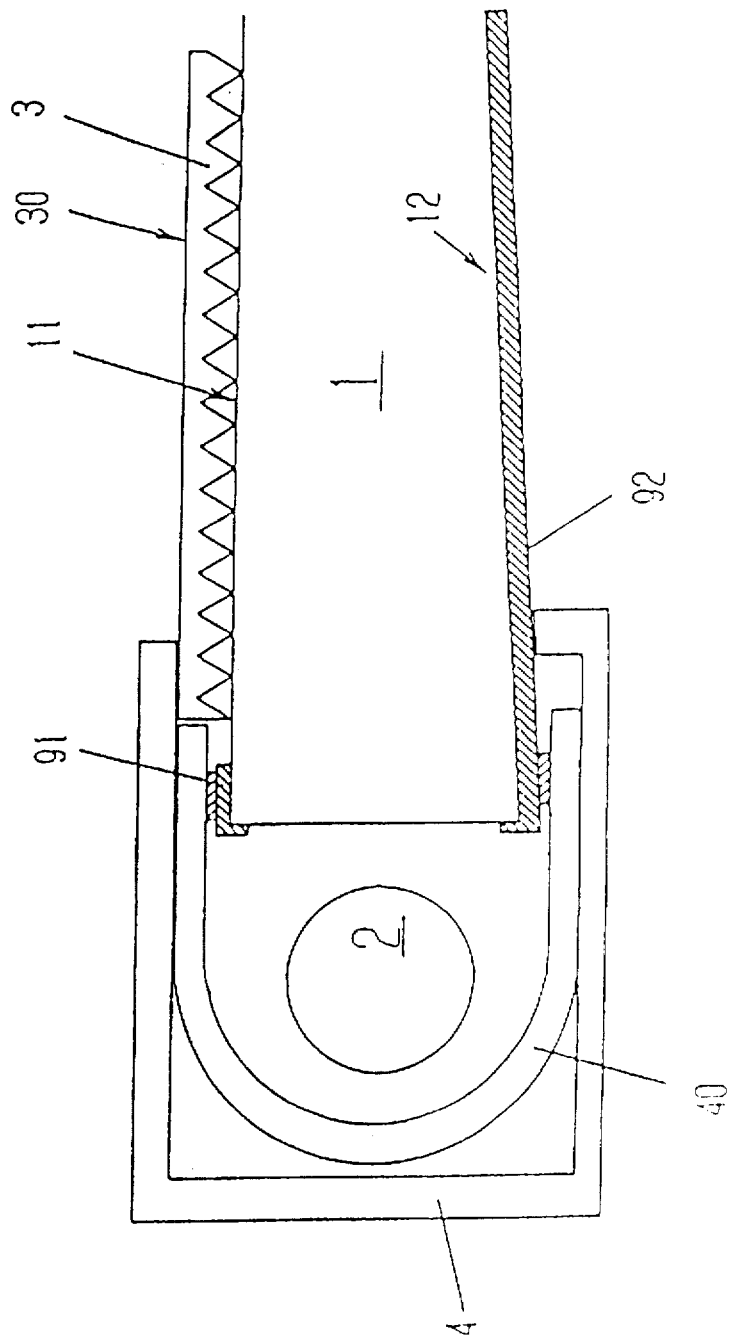
FIG. 14 is a sectional view showing a structure in the vicinity of a primary light source in a surface light source device of side light type according to a ninth embodiment of the present invention.

FIG. 14 is a sectional view showing the structure in the vicinity of a primary light source in a surface light source device of side light type according to the ninth embodiment of the present invention. According to the embodiment, a light-scattering light guide identical with that in the seventh embodiment is employed as a light guide plate 1. Concurrently, a light shielding layer 91 is mounted on a surface extending from a side portion of an emission surface 11 of the light guide plate 1 in the vicinity of a light source element 2 to an upper portion of an incidence surface 10 through an edge portion 61, and a light shielding layer 92 is mounted on a surface extending from a lower portion of the incidence surface 10 to an entire rear surface 12 of the light guide plate 1 through an edge portion 62. It is thereby possible to prevent light from intruding to the side of the light guide plate 1 with respect to a plane including the incidence surface 10. The structure and function other than the above discussion are basically identical with those in the embodiments.

The embodiment is characterized in that a metal having high reflecting properties such as silver or aluminum is vapor-deposited on the surface extending from the side portion of the emission surface 11 of the light guide plate 1 in the vicinity of the light source element 2 to the upper portion of the incidence surface 10 through the edge portion 61, and on the surface extending from the lower portion of the incidence surface 10 to the entire rear surface 12 of the light guide plate 1 through the edge portion 62, thereby forming the light shielding layers 91, 92. The metal layers are adapted to prevent light from intruding into the light guide plate 1 through surfaces other than the incidence surface 10.

The light shielding layer 92 in the embodiment is formed by integrally combining a reflection layer having the same function as that of a reflection sheet 6 mounted on the rear surface 12 of the light guide plate 1 with a light shielding layer covering the vicinity of the edge portion 62 between the incidence surface 10 and the rear surface 12 of the light guide plate 1.

Further, in the embodiment, the structure is designed as to directly secure a reflector 40 surrounding the light source element 2 and having the function as a reflecting member to the partial light shielding layers 91, 92 through, for example, adhesive, or an adhesive double-coated tape so as not to form a light intrusion path.

In the embodiment, no path is basically left for light emitted from the light source element 2 and intruding into the light guide plate 1 through positions other than the incidence surface 10, thereby avoiding intrusion of the light. Therefore, it is possible to substantially completely remove the above causes (1) and (2). Further, the edge portions 61, 62 of the incidence surface 10 are coated with the light shielding layers 91, 92, thereby preventing light from intruding through the edge portions 61, 62 into the light guide plate 1. Consequently, it is to be noted that a blocking action is also effected in the above path (3). It is naturally possible to relieve occurrence of so-called "emission line" due to light intruding into the light guide plate 1 through the edge portion 61 or the edge portion 62 of the light guide plate 1.

It should be noted that the light shielding layers 91, 92 in the embodiment are limited to the above metal layers and may be made of light absorptive material such as black resin. In this case, the light shielding layer corresponding to the rear surface 12 of the light guide plate 1 may be made of, for example, metal having reflecting properties or white resin while the remaining layer may be made of, for example, a light absorptive black resin. Alternatively, the light shielding layers 91, 92 themselves may include metal sheets, or light absorptive sheets to which, for example, black ink is applied, and may be formed apart from the light guide plate 1. The metal sheets or the light absorptive sheets may be stuck onto a surface of the light guide plate to serve as the light shielding layers 91, 92.

Figure 15:
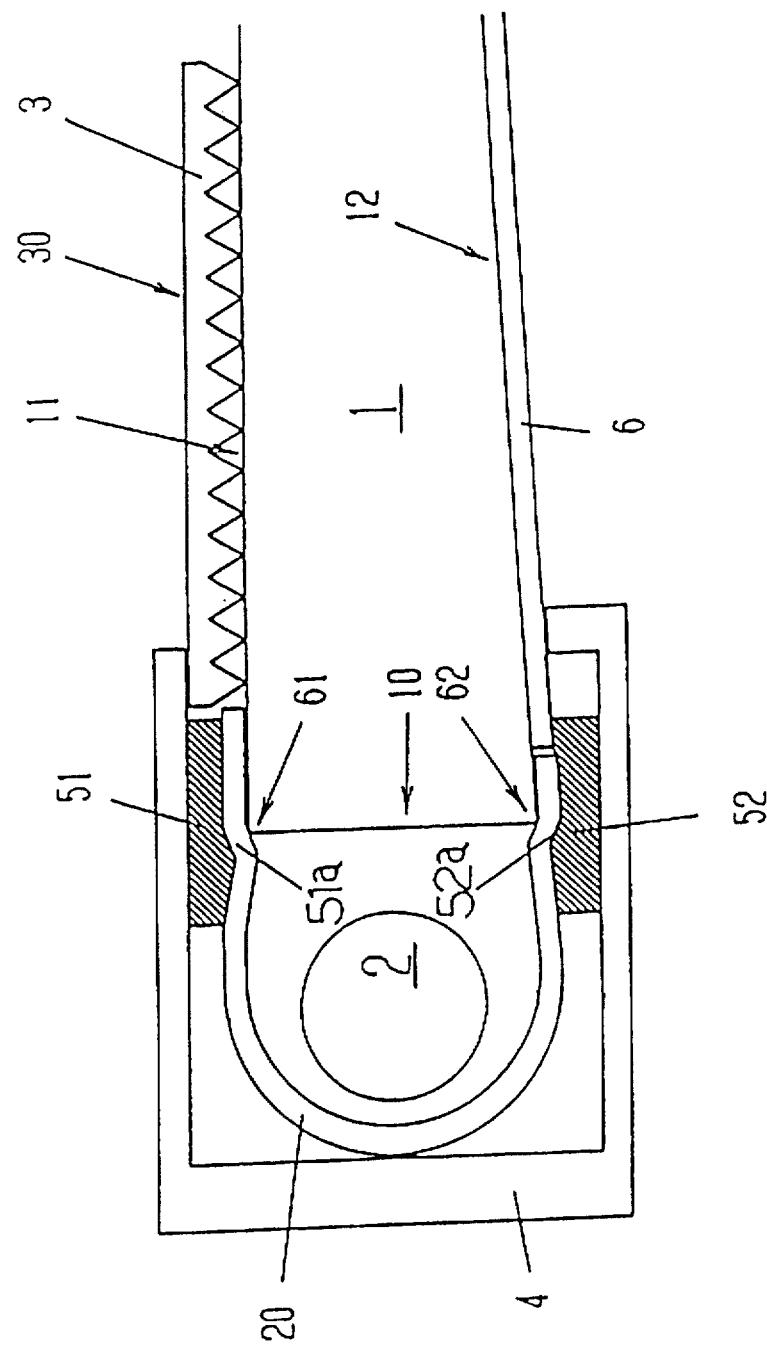
FIG. 15 is a sectional view showing a structure in the vicinity of a primary light source in a surface light source device of side light type according to a tenth embodiment of the present invention.

FIG. 15 is a sectional view showing the structure in the vicinity of a primary light source in a surface light source device of side light type according to the tenth embodiment of the present invention. In the embodiment equivalent to a modification of the fifth embodiment, it is aimed to more completely prevent the light from intruding through the upper and lower edge portions 61, 62 of the light guide plate 1 in the fifth embodiment.

The embodiment is characterized in that the spacers 51, 52 including the elastic members in the fifth embodiment are interposed between a reflection sheet 20 and a case member 4 as to extend from an emission surface 11 or a rear surface 12 of the light guide plate 1, and slightly project to the side of a light source element 2 with respect to a plane including an incidence surface 10. Concurrently, the case member 4 is formed to have spring properties, and the reflection sheet 20 and the case member 4 are attached to an end portion of the light guide plate 1 while the spacers 51, 52 being compressed and deformed by the spring properties of the case member 4.

In the embodiment, the spacers 51 and 52 are disposed in a state in which portions 51a, 52a of the spacers 51, 52 on the side of the light source element 2 project to the side of the light source element 2 with respect to the plane including the incidence surface 10 so that the portions interposed between the case member 4 and the light guide plate 1 are compressed. Therefore, as shown in the drawing, the reflection sheet 20 is attached to end portions of the light guide plate 1 while covering the upper and lower edge portions 61, 62 of the light guide plate 1, thereby substantially completely preventing light from intruding through the edge portions 61, 62. Further, since there are left substantially no other intrusion paths, as a whole, it is possible to considerably decrease a quantity of light intruding to the side of the light guide plate 1 with respect to the plane including the incidence surface 10 bypassing the incidence surface 10. As a result, the above causes (1) and (2) are considerably eliminated.

Further, the edge portions 61, 62 of the incidence surface 10 are coated with the reflection sheet 20, thereby preventing light from intruding through the edge portions 61, 62 into the light guide plate 1. Consequently, it is to be noted that a blocking action is also effected in above path (3). It is naturally possible to relieve occurrence of so-called "emission line" due to light intruding into the light guide plate 1 through the edge portion 61 or the edge portion 62 of the light guide plate 1.

In the structures according to the eighth to tenth embodiments, surface roughening may additionally be made to the incidence surface 10 of the light guide plate 1. As in the seventh embodiment, it is thereby possible to reduce lack of luminance in the emission surface (occurrence of so-called "dark band") in the vicinity of the incidence surface.

Further, in the structure according to the eighth to tenth embodiments, the light guide plate 1 may be made of transparent plastic material without the light-scattering light guide and the emission surface 11 may be roughened, or a convex lens array may be formed on the emission surface 11. In such cases, it is possible to provide the same effects as those described above.

As discussed in detail above, according to the present invention, it is possible to reduce irregularities in luminance occurring in the vicinity of the incidence surface of the light guide plate employed for the surface light source device of side light type. The reduction of irregularities in luminance is achieved with a little sacrifice of efficiency of light utilization and size of the luminant surface.

Therefore, if the surface light source device of side light type according to the present invention is applied to back lighting in a liquid crystal display, it is possible to obtain a screen which provide high-quality display without fringe-like irregularities in luminance (intrusive brightening).

What is claimed is:

1. A surface light source device comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate.

2. A surface light source device comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate, the means for preventing including a light shielding wall extending along the plane including said incidence surface.

3. A surface light source device comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface;

means for preventing light from said primary light source from passing a plane including said incidence surface for at least one of the edge portions of said light guide plate, said means for preventing including a light shielding wall extending along the plane including said incidence surface; and no light diffusing power is given to any one of said emission surface and said at least one additional element.

4. A surface light source device of side light type according to claim 2, wherein said light shielding wall extends from a case member surrounding said primary light source and along the plane including said incidence surface.

5. A surface light source device of side light type according to claim 2, wherein said light shielding wall extends from a reflector member surrounding said primary light source and along the plane including said incidence surface.

6. A surface light source device of side light type according to claim 2, wherein said light shielding wall extends from any one of said at least one additional element and along the plane including said incidence surface.

7. A surface light source device of side light type according to claim 3, wherein said light shielding wall extends from a case member surrounding said primary light source and along the plane including said incidence surface.

8. A surface light source device of side light type according to claim 3, wherein said light shielding wall extends from a reflector member surrounding said primary light source and along the plane including said incidence surface.

9. A surface light source device of side light type according to claim 3, wherein said light shielding wall extends from any one of said at least one additional element and along the plane including said incidence surface.

10. A surface light source device comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate, said means for preventing biasing said at least one additional element against said emission surface.

11. A surface light source device of side light type according to claim 10, wherein said means for preventing includes a case member surrounding said primary light source and having elasticity such that a head edge portion of the case member contributes to biasing said at least one additional element against said emission surface.

12. A surface light source device comprising:

at least one primary light source;

light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface;

means for preventing light from said primary light source from passing a plane including said incidence surface for at least one of the edge portions of said light guide plate, said means for preventing biasing said at least one additional element against said emission surface, and no light diffusing power is given to any one of said emission surface and said at least one additional element.

13. A surface light source device of side light type according to claim 12, wherein said means for preventing includes a case member surrounding said primary light source and having elasticity such that a head edge portion of the case member biases an end of said at least one additional element against said emission surface.

14. A surface light source device comprising:

at least one primary light source;

light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate, said means for preventing including a case member surrounding said primary light source, the case member having an end surface that lies on one of the edge portions of said light guide plate on.

15. A surface light source device of side light type according to claim 14, wherein a sheet member is interposed between an end portion of said light guide plate and the end surface of said case member.

16. A surface light source device of side light type according to claim 14, wherein a transparent sheet member is interposed between an end portion of said light guide plate and the end surface of said case member.

17. A surface light source device of side light type according to claim 14, wherein a sheet member having a light diffusing function is interposed between an end portion of said light guide plate and the end surface of said case member.

18. A surface light source comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate, said means for preventing including a sheet member provided with a light diffusing function and interposed between said incidence surface and said primary light source.

19. A surface light source device comprising:

at least one primary light source;

a light guide plate having a lateral incidence surface positioned adjacent to said primary light source for receiving light supplied from said primary light source, an emission surface and a rear surface opposite to said emission surface, the light guide plate having an edge portion on each of a border between the emission surface and the incidence surface and a border between the rear surface and the incidence surface;

at least one additional element being disposed along said emission surface;

a reflector being disposed along said rear surface; and means for preventing light from said primary light source from passing a plane including said incidence surface for at least one of the edge portions of said light guide plate, said means for preventing including a light shielding layer mounted on said light guide plate so that the light shielding layer extends from an end portion of said incidence surface, across one of the edge portions and to an end portion of one of said emission surface and said rear surface.

20. A surface light source device of side light type according to claim 19, wherein said light shielding layer is a reflective metal layer.

21. A surface light source device of side light type according to claim 19, wherein said light shielding layer is a light absorptive resin layer.

22. A surface light source device comprising:

at least one primary light source;

a light guide plate having a lateral incidence surface positioned adjacent to said primary light source for receiving light supplied from said primary light source, an emission surface and a rear surface positioned opposite to said emission surface;

at least one additional element being disposed along said emission surface;

a reflector being disposed along said rear surface;

a reflection sheet being disposed along an outer periphery of said primary light source to surround said primary light source;

a case member being disposed to surround said reflection sheet; and a presser member with elasticity, interposed between said reflection sheet and the case member, said light guide plate being coupled with said case member with said presser member elastically deformed.

23. A surface light source device of side light type according to claim 22, wherein said presser member is disposed such that it partially extends to said primary light source beyond the incidence surface of said light guide plate.

24. A surface light source device comprising:

at least one primary light source;

a light guide plate being provided with fine particles therein to produce a diffusing power, the light guide plate having a lateral incidence surface positioned adjacent to said primary light source for receiving light supplied from said primary light source, an emission surface and a rear surface opposite to said emission surface;

at least one additional element being disposed along said emission surface;

a reflector being disposed along said rear surface; and means for preventing light from said primary light source from passing a plane including said incidence surface for at least one of the edge portions of said light guide plate.

* * * * *

UNITED STATES PATENT AND TRADEMARK OFFICE
CERTIFICATE OF CORRECTION

PATENT NO. : 5,788,356

DATED : August 4, 1998

INVENTOR(S) : Watai et al.

It is certified that error appears in the above-indentified patent and that said Letters Patent is hereby corrected as shown below:

```
Cover Page, "FOREIGN PATENT DOCUMENTS", "4-4688" should
           be -- 4-42688 --.

Col. 1,    line 7, "the" should be --a--;

line 8, "a" (second occurrence) should be --the--.

Col. 18,   line 19, before "light", insert --a--.
```

Signed and Sealed this

Second Day of February, 1999

Attest:

Attesting Officer

*Acting Commissioner of Patents and Trademarks*